April 10, 1928.
S. HOLDENER
1,665,701
TRANSMISSION GEAR
Filed March 13, 1924
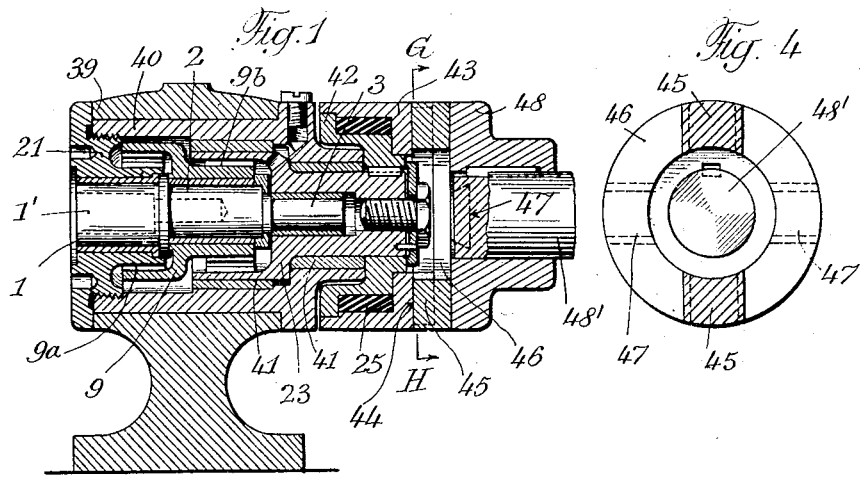
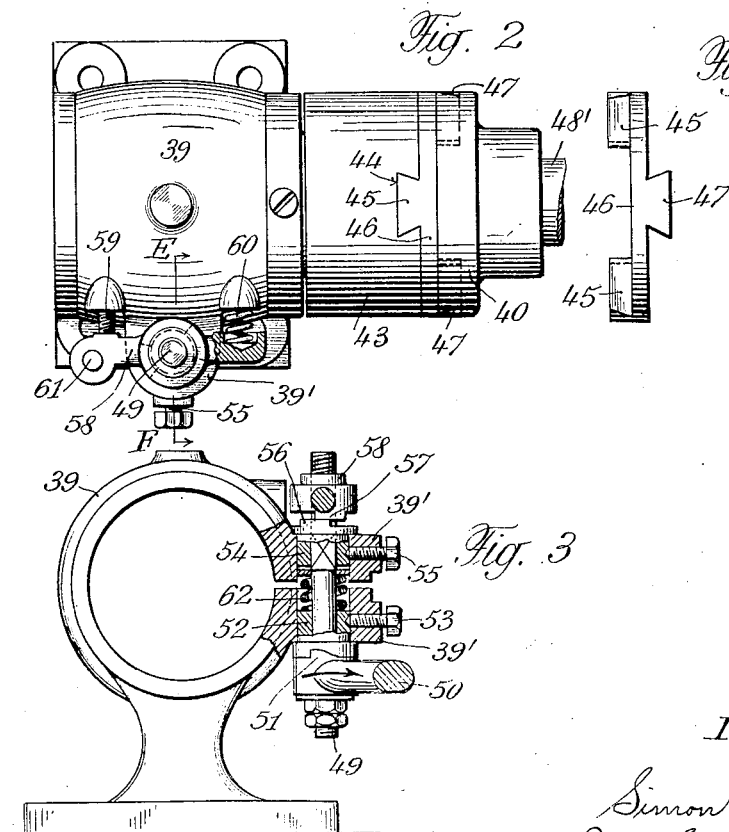
Inventor:
Simon Holdener,
By [signature]
Atty.

Patented Apr. 10, 1928.

1,665,701

UNITED STATES PATENT OFFICE.

SIMON HOLDENER, OF WOLFHAUSEN, SWITZERLAND, ASSIGNOR TO BENJAMIN KIENAST, OF SCHLOSSBERG, SWITZERLAND.

TRANSMISSION GEAR.

Application filed March 13, 1924, Serial No. 698,984, and in Switzerland March 29, 1923.

The invention relates to improvements in transmission mechanisms of the type comprising a transmitting member mounted on an eccentric shaft, said member being provided with two or more toothed rims or gears cooperating with further toothed rims or gears when the eccentric rotates, the latter rims being concentric to the axis of said shaft.

The object of the present invention is to provide a transmission mechanism particularly suitable for driving weaving looms in which the individual drive, from electric motors, is gradually introduced, and where the high speed of the shaft of the electric motor is materially reduced to suit the speed of the loom shaft.

The feature of the transmission mechanism according to the present invention consists in that one of the transmitting members cooperating by means of their toothed rims may be prevented from rotating by means of a split bearing casing by adjusting a clamping device cooperating with said bearing casing, the device being rendered inoperative by a release member in order to permit rotation of the aforementioned transmission member and thereby suspend the action of the transmission mechanism on the driven object.

A constructional example of the transmission mechanism according to the present invention is illustrated in the accompanying drawings, in which—

Figure 1 is a longitudinal section through the mechanism.

Fig. 2 is a plan view of Fig. 1.

Fig. 3 is an end view of Fig. 1 with parts shown in section on line E—F in Fig. 2.

Fig. 4 is a section on line G—H in Fig. 1, and Fig. 5 shows a detail.

In Figs. 1–5, 39 denotes a split bearing casing arranged as a standard. In this casing the gear shaft 1 having the eccentric 2 and the end arbor 3, the axis of which is concentric to the axis of the shaft, is rotatably mounted. 40 designates a hollow cylindrical body which is non-displaceable in the axial direction and to which the bush 21 is rigidly fixed. The latter is provided with external teeth which are in mesh with the internal teeth $9^a$ provided on the transmitting member 9 mounted on the eccentric 2. The external teeth $9^b$ on the transmitting member 9 are in mesh with the internal teeth of the hollow shaft 23, the axis of which is concentric to the axis of the shaft 1. The two toothed rims $9^a$ and $9^b$ of the transmitting member 9 are concentric to the axis of the eccentric, while the two toothed rims of the parts 21 and 23 are concentric to the axis of the shaft 1. 41 designates two bearing rings for the hollow shaft 23 inserted in the hollow body 40; 42 denotes a part rigidly fixed to the hollow shaft 23 and which is in driving engagement with a head part 43 by means of the enclosed resilient engaging dogs 25. The head part 43 is provided with a diametrically arranged groove 44 (Fig. 2) of dove-tail cross-section adapted to house two projecting parts of a corresponding cross-section and arranged diametrically opposite each other on the flat face of a disc 46 (shown in Fig. 5 in a position at right angles to that shown in Fig. 2). The disc 46 is provided on its opposite flat face with two projections 47 arranged at right angles to the projection 46, the projections 47 being also arranged diametrically opposite to each other and having dove-tail cross-sections. The projections 47 engage with correspondingly shaped grooves of a connecting piece 48 which is fixed by means of a sliding key to a shaft 48' which may, for instance, represent the main driving shaft of a loom. By means of the projections 45 and 47 the disc 46 protects the connecting piece 48 against an axial displacement with regard to the gear shaft 1 and ensures that it takes part in the rotating movement of the head part 43. The above described connection between the gear and the shaft 48' of the loom has for its object to prevent the transmission of the vibrations as well as of axial shocks from the shaft of the loom to the gear.

The split gear casing 39 is provided with lugs 39' arranged opposite to each other for taking up a clamping device. The latter comprises a spindle 49 on which an adjusting lever 50 is mounted, which co-operates by means of a beak 51, provided on the lever, with an inserted sleeve 52 the latter being fixed in position by a set screw 53 passing through the lug 39'. Within the second lug 39' a bush 54 is inserted, which may be fixed in position by the set screw 55 and which, owing to its square bore, which corresponds to the cross-section of the part of the spindle 49 within said bush, prevents a turning of the spindle. The inserted bush 54 is provided with flat cam parts 57 with which a two-armed release lever 58 co-operates, the latter being screwed to the spindle. Ordinarily the release lever 58 rests with its one arm against a stop 59 (Fig. 2) provided on the casing 39, and is pressed against that stop by the action of a spring 60 interposed between the second arm of the release lever and the casing 39. The first mentioned arm of the release lever 58 is provided with an eyelet 61 adapted to take up an adjustable part influenced by the stop-motion of the loom. A compression spring 62 is pushed over the spindle 49 and abuts with its one end against the bush 52 and with its other end against a disc resting against the square portion of the spindle 49, whereby the latter can be influenced in the axial direction by said spring. When the parts of the clamping device occupy the positions illustrated in Fig. 3 the split casing 39 is not clamped together. In this case and when the shaft 1, which is provided with a central bore 1′ having a key slot for connection to a driving shaft (i. e. to the shaft of the electro-motor), is driven, the transmitting member 9 and the parts 21 and 25 co-operating with the former, together with the hollow body 40 will rotate in a direction that is opposite to the direction of rotation of the shaft 1 (backwards) on account of the resistance of the shaft 48′ of the loom which the transmission gear encounters. If, on the other hand, the gear casing 39 is clamped together and the hollow body 40 together with the bush 21 is thereby prevented from rotating the transmitting member 9 carrying out eccentric movements causes the hollow shaft 23 to rotate in the same direction as the gear shaft 1 but at a reduced speed (ahead running). This turning motion is transmitted from the hollow shaft 23 to the shaft 48′ of the loom for actuating the latter through the intermediary of the parts 42, 43, 46 and 48.

In order to clamp the gear casing 39, the adjusting lever 50 of the clamping device is turned in the direction of the arrow indicated in Fig. 3, so that the beak 51 leaves the notch provided in the bush 52 and moves up the inclined face of the notch whereby the two lugs 39′ of the casing 39 are brought nearer to each other and the spring 62 is compressed.

When the stop motion of the loom becomes operative the release lever 58 is displaced against the action of the spring 60, so that the cam 57 on the release lever moves off the cam 56 on the bush 54. Thereupon the two lugs 39′ of the casing 39 are moved away from each other to such an extent that, by the influence of the springing action inherent to the casing 39 and of the compression spring 62, the cams 56 and 57 of the release lever 58 and of the bush 54 respectively come to bear mutually against the flat facing of the other parts (54 and 58 respectively). In this case the hollow body 40 together with the bush 21 can rotate again, whereby the gear runs idle and the loom is no longer driven.

In order to return the release lever 58 into the shown position in which it is ready to operate, the adjustment lever 50 is turned back so that its beak 51 enters the notch in the bush 52. Thereby the spring 62 causes an axial displacement of the spindle 49 to such a degree that the release lever 58 is turned back by the influence of the spring 60, so that the cam 57 rests again on the cam 56 of the bush. The toothed rims or gears are preferably, although not necessarily, constructed as disclosed and claimed in my Patent 1,538,328, issued May 19, 1925, on an application filed as a division of the present application.

I claim:

1. In a transmission gear adapted for use in driving looms, a shaft, an eccentric on said shaft, a transmitting member loosely mounted on said eccentric, an internally toothed rim and an externally toothed rim provided on said transmitting member, a split casing, a bush rotatable in said casing, an externally toothed rim operatively connected to said bush and in mesh with the internally toothed rim of the transmitting member, an organ adapted for power-transmission to outside of the gear and operatively connected to the loom shaft, an internally toothed rim on said organ and in mesh with the externally toothed rim on the transmitting member, means to clamp said split casing to prevent said bush from rotating and cause thereby the gear to transmit power, and means to operate said clamping means.

2. In a transmission gear adapted for use in driving looms, a shaft, an eccentric on said shaft, a transmitting member loosely mounted on said eccentric, an internally toothed rim and an externally toothed rim provided on said transmitting member, a split casing, a bush rotatable in said casing, an externally toothed rim operatively connected to said bush and in mesh with the internally toothed rim of the transmitting member, an organ adapted for power transmission to outside of the gear and operatively connected to the loom shaft, an internally toothed rim on said organ and in mesh with the externally toothed rim on the transmitting member, means to clamp said split casing to prevent said bush from rotating and cause thereby the gear to transmit power, and a release lever adapted to render said clamping means inoperative, said lever being influenced by the stop motion of the loom.

3. In a transmission gear adapted for use in driving looms, a shaft, an eccentric on said shaft, a transmitting member loosely mounted on said eccentric, an internally toothed rim and an externally toothed rim provided on said transmitting member, a split casing, a bush rotatable in said casing, an externally toothed rim operatively connected to said bush and in mesh with the internally toothed rim of the transmitting member, an organ adapted for power transmission to outside of the gear and operatively connected to the loom shaft, an internally toothed rim on said organ and in mesh with said externally toothed rim on the transmitting member, means to clamp said split casing to prevent said bush from rotating and cause thereby the gear to transmit power, and a release lever adapted to render said clamping means inoperative, means to operate said lever, a spring acting on said release lever, and a projecting part on the release lever co-operating with a projecting part of an adjacent facing stationary with regard to the casing, the stop motion causing a turning motion of the release lever whereby said projecting parts are brought out of contact with each other and the clamping means rendered inoperative.

4. In a transmission gear adapted for use in driving looms, a shaft, an eccentric on said shaft, a transmitting member loosely mounted on said eccentric, an internally toothed rim and an externally toothed rim provided on said transmitting member, a split casing, a bush rotatable in said casing, an externally toothed rim operatively connected to said bush and in mesh with the internally toothed rim of the transmitting member, an organ adapted for power transmission to outside of the gear and operatively connected to the loom shaft, an internally toothed rim on said organ and in mesh with the externally toothed rim on the transmitting member, means to clamp said split casing to prevent said bush from rotating and cause thereby the gear to transmit power, and a release lever adapted to render said clamping means inoperative, means to operate said lever, a spindle co-operating with said casing so that an axial displacement of the spindle causes the clamping action, an adjusting lever turnable on said spindle and secured against displacement relatively to said spindle, and a beak on said lever co-operating with a notch in a facing stationary with regard to the casing, whereby a turning of said adjusting lever causes the beak to leave said notch, the spindle being axially displaced thereby and the casing clamped.

5. In a transmission gear adapted for driving looms a casing comprising a split sleeve, a bush closing one end of the casing and loose therein and having external gear teeth, a hollow cylindrical body in the sleeve and secured to said bush, a driving shaft having two bearing portions and an intermediate excentric portion, one of said two portions bearing in said bush, a transmitting member on the excentric portion of said shaft having an internal gear at one end meshing with the gear on said bush, and an external gear on its opposite end, a hollow shaft mounted on the third driving shaft portion and having an internal gear meshing with the external gear on said transmitting member, a driven shaft, and means to clamp said sleeve on said hollow cylindrical body said body having a flange between which and said bush the sleeve is included.

6. A transmission mechanism, including a shaft having an eccentric, a transmission member rotatably mounted on said eccentric, a hollow cylindrical body encircling said transmission member, an external gear connected to said cylindrical member and disposed within said transmission member, an internal gear in said transmission member, meshing with and eccentrically disposed in respect to said external gear, a driven member projecting into said cylindrical member and having an internal gear concentric with said shaft, said transmission member having an external eccentric gear within and meshing with said second mentioned internal gear, a bracket serving as a support for said transmission member and including a split sleeve engaging with and supporting said cylindrical member, and means for clamping said sleeve to prevent or permit rotation of said cylindrical member.

7. A transmission gear for looms, including a shaft, an eccentric on said shaft, a transmitting member loosely mounted on said eccentric, a cylindrical member concentric with said shaft, a pair of eccentric gears, one mounted within the other and one connected to said cylindrical member and the other to said transmitting member, a driven member, a pair of meshing eccentric gears, one within the other and one connected to said transmitting member and the other to said driven member, a split casing encircling said cylindrical member, means for clamping said split casing to prevent said cylindrical member from rotating, a release lever adapted to render said clamping means inoperative, a spring connected to said release lever, and a projecting part on the release lever co-operating with a projecting part stationary with respect to the casing, whereby the clamping means may be rendered inoperative upon a turning movement of the release lever against the action of said spring.

8. A transmission gear for driving looms, including a casing, a bushing closing one end of said casing and rotatable therein and having an external gear, a hollow cylindrical body in said casing and secured to said bushing, a driving shaft having a bearing portion in said bushing and an eccentric within said cylindrical body, but spaced therefrom, a transmission member on said eccentric and having an internal gear at one end meshing with said first mentioned gear and an external gear at the opposite end, a hollow driven shaft co-axial with said driving shaft and having an internal gear meshing with said second mentioned external gear, said hollow shaft having a bearing in said cylindrical body, and means for preventing or permitting rotation of said cylindrical member.

9. A transmission gear for looms, including a shaft, an eccentric on said shaft, a transmitting member loosely mounted on said eccentric, a cylindrical member concentric with said shaft, a pair of eccentric gears, one mounted within the other and one connected to said cylindrical member and the other to said transmitting member, a driven member, a pair of meshing eccentric gears, one within the other and one connected to said transmitting member and the other to said driven member, a bracket serving as a support for said transmission member and including a split sleeve engaging with and supporting said cylindrical member, and means for clamping said sleeve to prevent or permit rotation of said cylindrical member.

In testimony that I claim the foregoing as my invention, I have signed my name.

SIMON HOLDENER.